United States Patent [19]
Baxter

[11] Patent Number: 5,215,027
[45] Date of Patent: Jun. 1, 1993

[54] FLOATING DOCK/BREAKWATER AND METHOD FOR MAKING SAME

[76] Inventor: Hal T. Baxter, 1624 5th St. Dr. NW., Hickory, N.C. 28601

[21] Appl. No.: 868,320

[22] Filed: Apr. 14, 1992

Related U.S. Application Data

[63] Continuation-in-part of Ser. No. 624,033, Dec. 7, 1990, Pat. No. 5,107,785.

[51] Int. Cl.$^5$ ............................................. B63B 35/38
[52] U.S. Cl. .................................. 114/266; 114/65 A
[58] Field of Search ................... 114/65 A, 266, 267; 405/26, 219; 14/27; 264/228, 256, 333; 106/99; 52/309.17

[56] References Cited

U.S. PATENT DOCUMENTS

| | | | |
|---|---|---|---|
| Re. 31,984 | 9/1985 | Sluys | 114/267 |
| 3,091,203 | 5/1963 | Usab | 114/266 |
| 3,546,773 | 12/1970 | Gerstin | 114/266 |
| 3,799,093 | 3/1974 | Thomson | 114/266 |
| 4,265,193 | 5/1981 | Sluys | 114/267 |
| 4,318,361 | 3/1982 | Sluys | 114/267 |
| 4,321,882 | 3/1982 | Sluys | 114/267 |
| 4,406,564 | 9/1983 | Hanson | 114/267 |
| 4,487,151 | 12/1984 | Deiana | 114/266 |
| 4,693,631 | 9/1987 | McKay | 405/26 |
| 4,709,647 | 12/1987 | Rytand | 114/267 |
| 4,715,307 | 12/1987 | Thompson | 114/267 |
| 4,938,629 | 7/1990 | Boudrias | 405/219 |

*Primary Examiner*—Jesûs D. Sotelo
*Attorney, Agent, or Firm*—Bell, Seltzer, Park & Gibson

[57] ABSTRACT

A concrete floatation module adapted for use as a floating dock or breakwater includes a molded concrete shell and a buoyant core positioned therein to also serve as a molding core. Integrally molded lengthwise extending tubular liners define passageways through the module for the passage of an interconnecting cable or rod therethrough to facilitate interconnecting a series of modules in end-to-end relation, or other configurations. Widthwise extending tubular liners may also be provided to facilitate the interconnecting of laterally extending branches of modules. The floatation modules may be readily formed on-site by integrally molding the buoyant foam core and tubular liners in the concrete shell. Upper and lower assemblies of tubular liners hold the buoyant core in proper position as the concrete is poured into the mold.

42 Claims, 5 Drawing Sheets

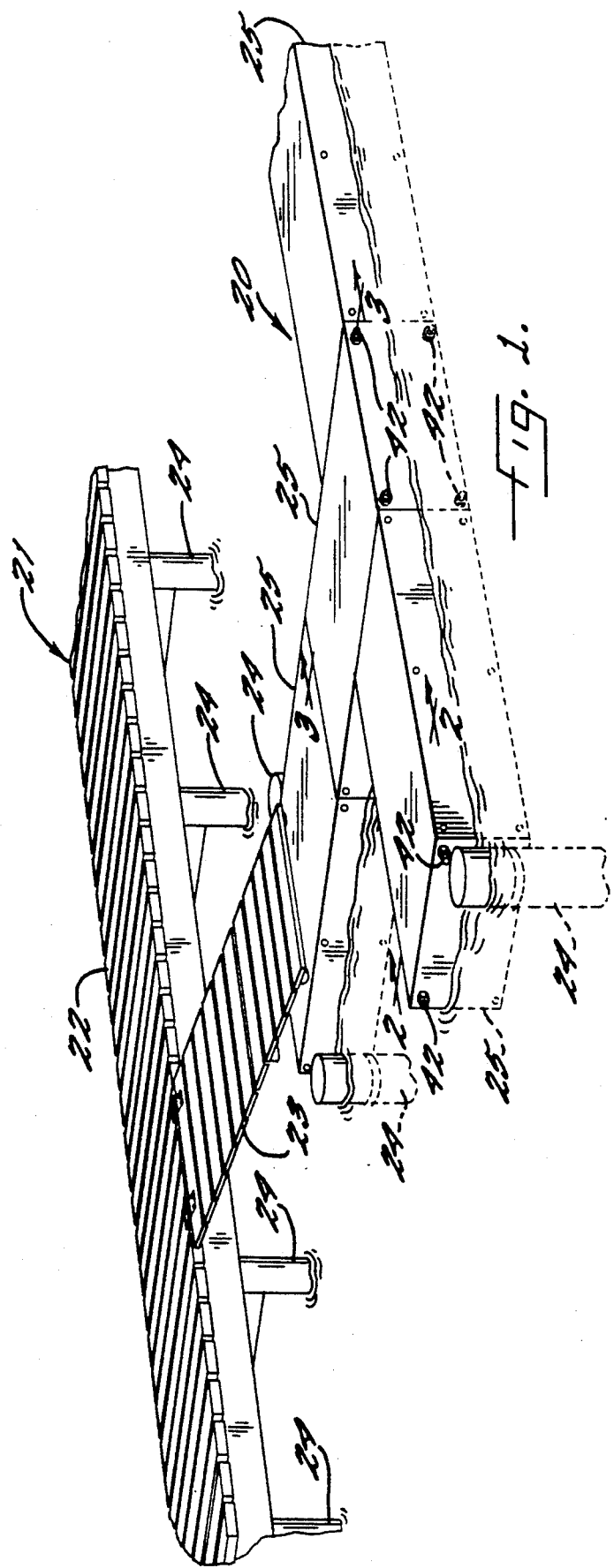

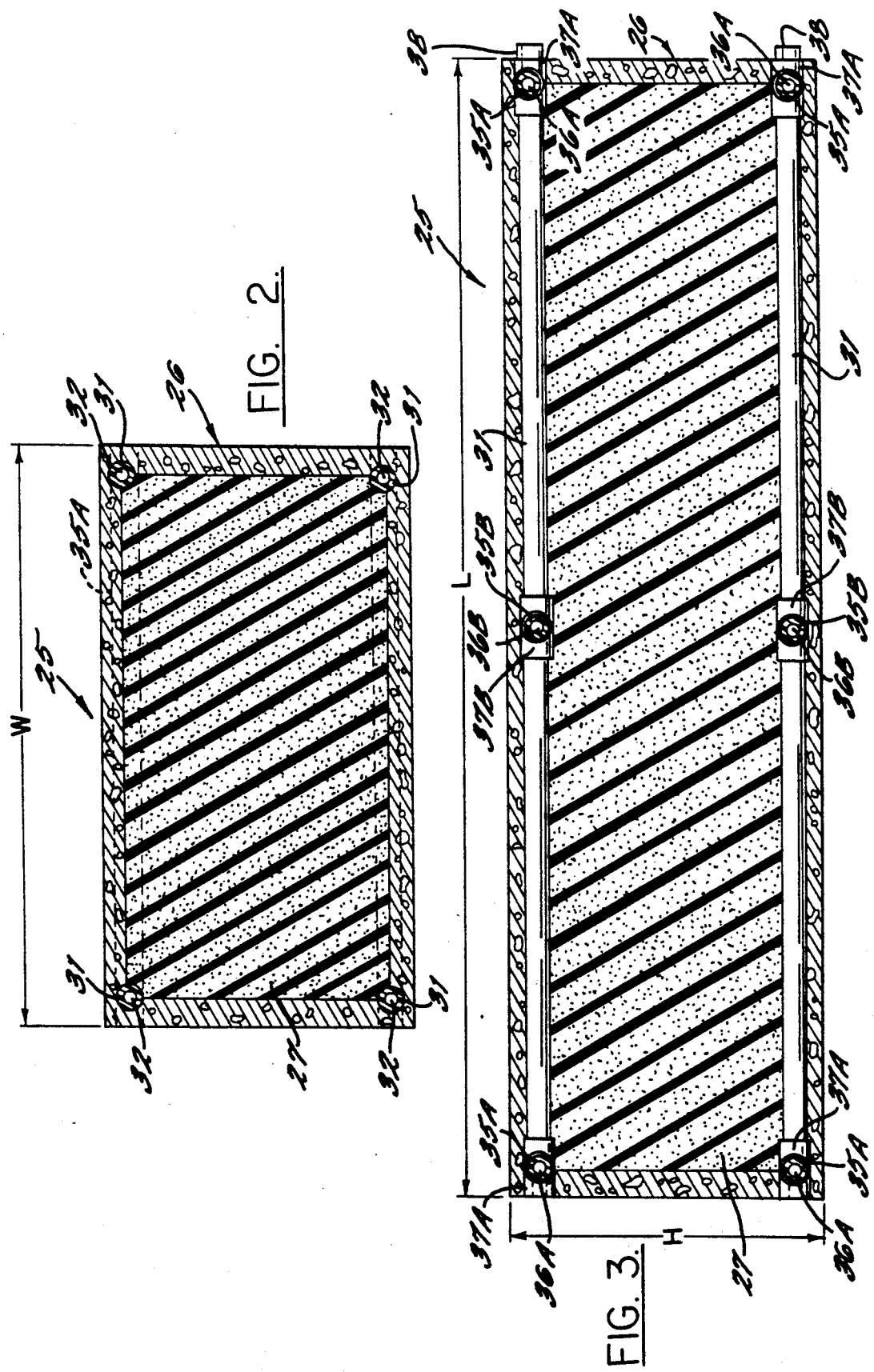

FLOATING DOCK/BREAKWATER AND METHOD FOR MAKING SAME

CROSS-REFERENCES TO RELATED APPLICATIONS

This is a continuation-in-part of U.S. patent application Ser. No. 07/624,033, filed Dec. 7, 1990, now U.S. Pat. No. 5,107,785.

FIELD OF THE INVENTION

The invention relates to concrete floating docks and breakwaters, and more particularly to a floating dock or breakwater formed of a series of concrete floatation modules and a method for making the floatation modules.

BACKGROUND OF THE INVENTION

Concrete floating docks and breakwaters, such as described in U.S. Pat. No. 4,318,361 to Sluys, are often assembled from a series of floating concrete modules. The modules typically comprise either a hollow concrete shell or a concrete shell surrounding a buoyant foam core. For use as a breakwater or a dock, the assemblage of modules are typically connected at one or both ends to an anchoring point, such as a driven piling or a weighted anchor. As a breakwater, the assemblage of modules is intended to absorb or reflect the incident wave energy and thereby provide a sheltered area of relatively calm water for the mooring of boats. When used as a dock, an assemblage of modules may be fitted with a suitable decking material, or the upper exposed concrete surface may be provided with a slip resistant finish.

Interconnection of the floating concrete modules for a dock or breakwater has been accomplished in a number of ways. For example, U.S. Pat. No. 4,693,631 to McKay discloses a pair of longitudinal strips running alongside and secured to the upper opposing sides of adjacent modules. In a similar fashion, U.S. Pat. No. 4,709,647 to Rytand discloses opposing inner and outer sidewales, preferably formed of wood, for maintaining adjacent modules in alignment while leaving a one or two foot gap therebetween.

U.S. Pat. No. 3,091,203 to Usab discloses a floating dock with adjacent modules joined at an upper portion by an overhanging flange which thereby positions the lower portions of adjacent modules in spaced apart relation. The concrete modules also include tubular liners extending in only the upper portion of the modules to serve as channels for interconnecting cables. Thus, the interconnecting cables act only on the upper portions of the modules and the bottom portions of the modules are in spaced apart relation.

Unfortunately, interconnection of adjacent floatation modules in a floating dock or breakwater at only the top portion of the modules allows the modules to pivot relative to one another. Such pivotal movement places high stress forces on any interconnecting member and may subject such a member to premature failure. In addition, the pivoting motion provides a less effective inertial barrier to wave action and also creates an unstable surface for dock users. If the bottom portions of adjacent modules collide during the pivoting movement, damage to the modules at the point of collision is likely.

U.S. Pat. No. 4,321,882 to Sluys discloses chains or cables passing through two side-by-side passageways centrally located through a series of modules with a pair of resilient spacers positioned between adjacent modules. The modules are thus allowed to move pivotally with respect to one another. The pivotal movement of adjacent modules places considerable stress on the resilient spacers and may result in increased maintenance expense for repairing damaged or worn resilient spacers. The pivoting provides a less effective inertial barrier to the wave action and also may create an unstable surface for dock users. The pivoting action about a center point may damage both the top and bottom portions of adjacent modules when these portions collide as a result of wave action.

SUMMARY OF THE INVENTION

In view of the foregoing background, it is an object of the present invention to provide a floatation module for use as a floating dock or breakwater that may be securely positioned against an adjacent module to reduce relative movement between the modules.

It is another object of the present invention to provide a floatation module that may be readily interconnected to additional modules to form a floating dock or breakwater.

It is yet another object of the present invention to a provide floatation module and method for making such modules so that the modules may be readily made in an efficient and cost effective manner.

These and other objects according to the present invention are provided by a rectangular floatation module formed of a molded rectangular concrete shell and a buoyant core positioned therein with integrally molded lengthwise extending tubular liners at the corners of the concrete shell. The buoyant core is preferably formed of a rectangular block of rigid floatation material, such as expanded polystyrene foam, and includes cutaway corner portions defining continuous open-sided channels for receiving the tubular liners so that tubular liners may be integrally molded in the floatation module. The tubular liners are preferably formed of a plastic material to avoid corrosion in a marine environment. The tubular liners permit the passage of an interconnecting cable or chain therethrough to secure a plurality of concrete floatation modules together when assembling a floating dock or breakwater.

The buoyant core of the concrete floatation module may also preferably include widthwise extending cutaway corner portions defining widthwise extending continuous open-sided channels for receiving respective tubular liners therein. The widthwise extending tubular liners preferably intersect respective ones of the lengthwise extending tubular liners lying in a common plane. Thus, a lower assembly and an upper assembly of tubular liners may be positioned within a mold to properly position the buoyant core within the mold and to securely hold the core as the concrete is poured into the mold.

Similarly, widthwise extending tubular liners may also be received in respective widthwise extending channels of a medial portion of the buoyant core. The widthwise and lengthwise extending tubular liners permit interconnection of adjacent floatation modules in various configurations, such as for forming laterally extending branches.

Another aspect of the buoyant core is that the cutaway corner portions are preferably formed using a hot cutting wire or blade which also serves to heat fuse the channel surfaces. Thus, a more impervious surface to moisture is provided and the tendency of the foam to crumble at the corners is greatly reduced.

The concrete shell may also preferably include polyolefin fibers incorporated therein to reinforce the concrete. The fibers are impervious to corrosion unlike common metal reinforcing materials. In addition, since the fibers are premixed in the concrete, construction labor is saved since reinforcing members do not have to be separately assembled in the concrete mold as with traditional metal reinforcements.

Aligning adjacent modules in the water may be difficult if the water's surface is not completely calm. Accordingly, an additional feature of the invention is that at least two of the tubular liners may extend outwardly beyond an end of the molded concrete shell a predetermined distance, for example, about 2 inches. An adjacent module preferably has at least two of the tubular liners being recessed inwardly from an end of the molded concrete shell a predetermined distance to receive the corresponding outwardly extending tubular liners of an adjacent module.

An interconnecting means, such as a cable, rope, rod, or chain, is passed through the passageways presented by the tubular liners and secured at the ends of a series of modules to form a floating dock or breakwater. The interconnecting means is kept at a desired tension to place the modules under compression and to prevent unwanted movement of adjacent modules relative to one another. Thus, the compressive strength of concrete and the tensile strength of steel, for example, may be combined to produce the floating dock or breakwater.

The floatation module according to the present invention may be readily formed on-site and placed into the water. Four tubular liners are positioned in each of the respective lengthwise extending corner portions of a generally rectangular mold with the tubular liners supporting a buoyant molding core of a generally rectangular block of rigid floatation material in a spaced apart relation from the sides and bottom of the mold. Concrete is then poured into the mold to fill the space between the buoyant core and the mold and to cover the upper surface of the buoyant core to thereby form a concrete shell surrounding the buoyant core while integrally molding the tubular liners in the concrete shell. The tubular liners preferably include end portions that extend outwardly through openings in the mold so as to be securely held by the mold.

To further reinforce the tubular liners during the concrete pouring step, metal pipes, rods, or other elongate reinforcing members may be inserted into the lengthwise extending tubular liners, for example. One or more securing straps may also be fastened surrounding the lengthwise extending tubular liners and the buoyant core to further securely position the buoyant core within the mold.

If widthwise extending tubular liners are desired in the finished concrete floatation module, a lower assembly of intersecting lengthwise and widthwise extending tubular liners is positioned into the bottom portion of the rectangular mold. The buoyant core is then positioned on the lower assembly of tubular liners and an upper assembly of lengthwise and widthwise tubular liners is then positioned in the mold onto the buoyant core. The concrete is then poured to fill in the space between the buoyant core and the mold, and to cover the upper surface of the core. The upper and lower assemblies of lengthwise and widthwise extending tubular liners serve to maintain the core in proper alignment with respect to the mold so that a desired and uniform thickness of the walls of the concrete shell is obtained.

BRIEF DESCRIPTION OF THE DRAWINGS

FIG. 1 is a perspective view of a floating dock according to the invention.

FIG. 2 is a cross-sectional view of a concrete floatation module taken along lines 2—2 of FIG. 1.

FIG. 3 is a longitudinal cross-sectional view of a concrete floatation module taken along lines 3—3 of FIG. 1.

DETAILED DESCRIPTION OF THE PREFERRED EMBODIMENT

Figure 4A:
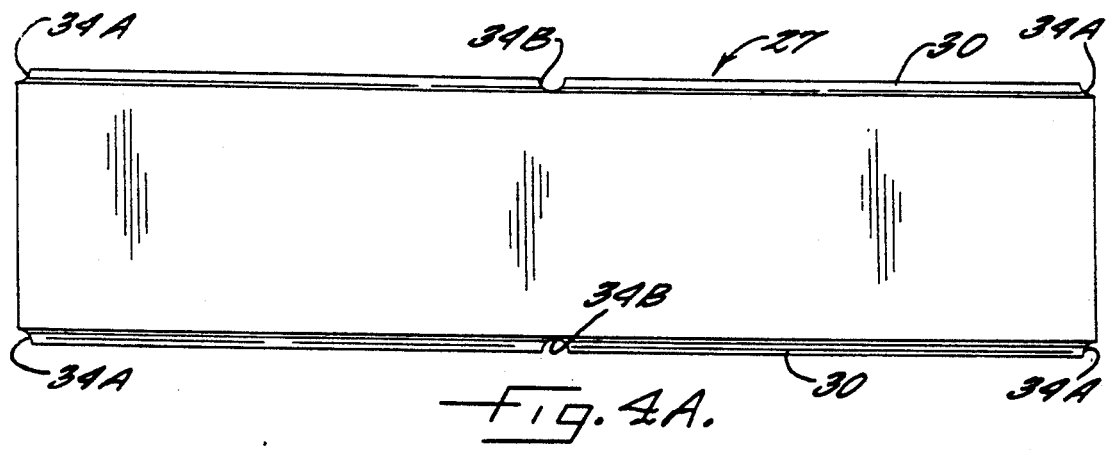
FIG. 4A is a longitudinal side view of a buoyant core used in the flotation module according to the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, applicant provides this embodiment so that this disclosure will be thorough and complete, and will fully convey the scope of the invention to those skilled in the art. Like numbers refer to like elements throughout.

Referring to FIG. 1, there is shown a concrete floating dock 20 according to the invention in combination with a conventional permanently anchored wooden dock 21. In the illustrated embodiment, the concrete floating dock 20 is connected to the wooden deck surface 22 of the wooden dock by a hinged ramp 23 so that the concrete floating dock 20 may rise and fall with the changing water level. The concrete floating dock 20 is secured to several driven wooden pilings 24 so that the floating dock is adjacent the wooden dock 20 yet is also free to rise and fall with the changing water level. As would readily be understood by those skilled in the art, the concrete floating dock may be secured in place by other means, such as weighted anchors.

The concrete floating dock 20 includes a series of interconnected concrete floatation modules 25 as described in greater detail below. The floatation modules 25 may be interconnected in a lengthwise, widthwise or in a combination of lengthwise and widthwise orientations, by a series of interconnecting cables, rods, ropes, or chains extending through the modules and secured at the ends thereof. It would be readily understood by those skilled in the art that the concrete floatation modules 25 may also be interconnected to be used as a floating breakwater, such as by interconnecting a series of floatation modules 25 to form a pattern of two lengthwise extending modules followed by a widthwise extending module, not shown. This pattern may be repeated for the desired length of the breakwater.

Referring now to FIGS. 2-4B, the concrete floatation module 25 of the present invention will be more fully described. The concrete floatation module 25 is formed of a molded concrete shell 26 surrounding a buoyant core 27 of a block of rigid floatation material. As explained in greater detail with respect to the method according to the invention, the buoyant core 27 provides buoyancy for the finished concrete floatation module 25, as well as serving as a molding core during the making of the module.

The molded concrete shell 26 is preferably formed of a concrete mixture reinforced with collated fibrillated polyolefin fibers. Suitable fibers are available under the trademark Forta CR, manufactured by Forta Corporation, 100 Forta Drive, Grove City Pa., 16127. The fibers are mixed into the concrete prior to pouring preferably at a minimum rate of 1.6 pounds of fiber per cubic yard of concrete. The fibers provide reinforcement to the concrete and may be used in place of conventional wire mesh or steel rod reinforcements which may be subject to corrosion in the marine environment. Conventional metal reinforcement methods also require labor to accurately position the reinforcements in the mold prior to pouring of the concrete. The fiber reinforcement according to the present invention obviates the need for this additional labor.

Figure 4B:
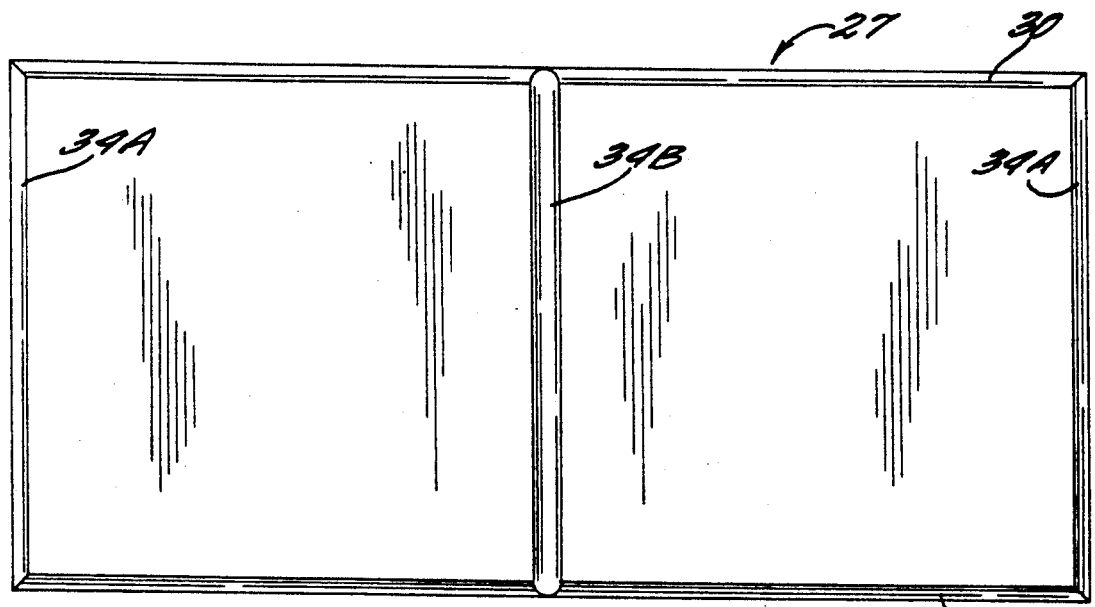
FIG. 4B is a plan view of the buoyant core as shown in FIG. 4A.

The buoyant foam core 27 is preferably formed of expanded polystyrene foam, or other rigid floatation material, and includes lengthwise extending cutaway corner portions defining lengthwise extending continuous open-sided channels 30 as best shown in FIGS. 4A and 4B, A respective lengthwise extending tubular liner 31 is received in each of the lengthwise extending continuous open-sided channels 30. The tubular liners are preferably polyvinyl chloride (PVC) which is impervious to corrosion in a marine environment. The opposite ends of the lengthwise extending tubular liners 31 are open to present a passageway therethrough 32 for facilitating interconnecting a series of floatation modules 25.

The surfaces of the lengthwise extending open-sided channels 30 of the buoyant core 27 are preferably heat-fused or heat-sealed to strengthen the surface and render the surface more impervious to moisture. The heat fusing may be achieved by passing a heated wire or other heated cutting blade, formed into the desired arcuate cross-sectional shape of the open-sided channel, along the corner portions of a rectangular foam block. Thus, the heated cutter simultaneously removes the unwanted corner material while heat fusing the surface of the channels.

Widthwise extending continuous open-sided channels 34a are similarly provided at respective widthwise extending corner portions of the buoyant core 27. The widthwise extending open-sided channels 34a receive therein respective widthwise extending tubular liners 35a. The widthwise extending tubular liners 35a also have opposite open ends to present respective passageways 36a therethrough. Thus, the widthwise extending tubular liners 35a permit the interconnection of a series of floatation modules 25 in a lateral, or side-by-side arrangement.

The lengthwise extending tubular liners 31 preferably intersect respective ones of the widthwise extending tubular liners 35a lying in the same plane, that is, either the upper plane or the lower plane. As would be readily understood by those skilled in the art, the intersection points may be provided by conventional four-way PVC couplings 37a. The tubular liners 31, 35a may also be notched and glued at the points of intersection.

As illustrated in FIG. 3, at least two of the lengthwise extending tubular liners 31 may preferably include an end portion 38 which extends outwardly beyond the end of the molded concrete shell 26. In addition, at least two tubular liners 31 may also be recessed inwardly from the opposite end of the concrete shell 26. The outwardly extending tubular liner end portions 38 of a first module may thus be positioned in mating engagement with the corresponding recesses of an adjacent floatation module to thereby facilitate proper alignment of the two floatation modules during assembly in the water.

The concrete floatation module 25 is preferably sized to have a length L substantially equal to twice the width W to thereby facilitate interconnection of a lengthwise extending module to a widthwise extending module forming an L-shaped assembly. A widthwise extending continuous open-sided channel 34b and respective widthwise extending tubular liner 35b are provided in upper and lower medial portions of the buoyant core 27. The medial widthwise extending tubular liners 35b present respective passageways 36b therethrough to permit interconnection of a lengthwise extending floatation module to a widthwise extending module. The intersection points of the medial widthwise extending tubular liners with the lengthwise extending tubular liners 31 may also be provided with a four-way PVC coupling 37b.

The concrete floatation module 25 is also preferably sized having overall dimensions so that it may readily be formed on-site and moved with standard equipment, such as a backhoe, to its final placement in a body of water. Preferable approximate dimensions for the concrete floatation module 25 are 104" L×52" W×28" H. The molded concrete shell 26 also preferably has a wall thickness of approximately 2" to provide adequate strength without using an unnecessary quantity of concrete. The preferred dimensions also provide a desired freeboard for the concrete floating dock 20 (FIG. 1) of approximately 8 inches to facilitate ingress and egress for typical recreational boats.

Figure 5:
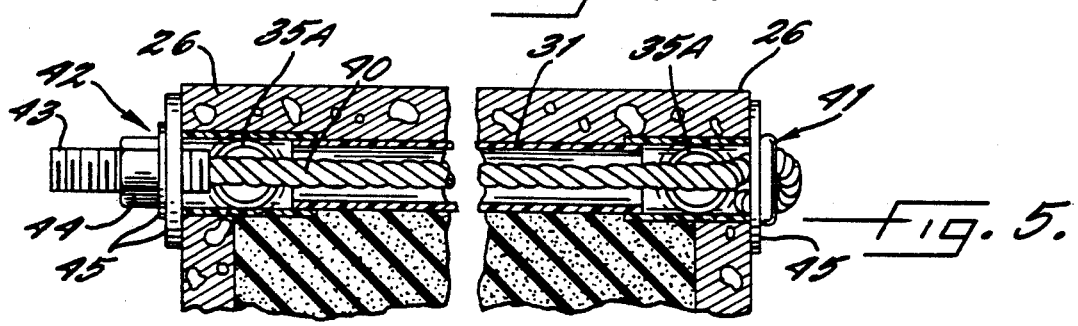
FIG. 5 is an enlarged cross-sectional view of two corner portions of two concrete floatation modules assembled in end-to-end series relation according to the present invention illustrating the positioning of an interconnecting cable through the lengthwise extending tubular liners of the modules.
Figure 6:
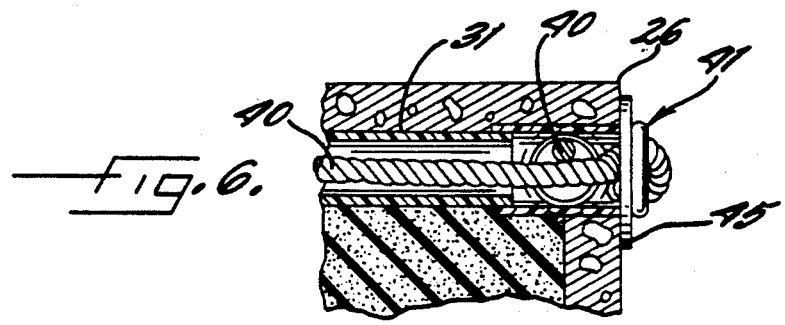
FIG. 6 is an enlarged cross-sectional view of a corner detail of a floatation module according to the present invention illustrating the positioning of crossing interconnecting cables through the intersecting lengthwise extending and widthwise extending tubular liners.

Referring to FIGS. 1, 5 and 6, the interconnection of a series of modules to form a concrete floating dock 20 is best understood. An interconnecting means, such as a steel cable 40, is positioned extending through the passageways 32 presented by the respective lengthwise extending tubular liners 31. Other interconnecting means may also be used, such as a chain or rope, or threaded rod, as would be readily understood by those having skill in the art. As would also be readily understood by those skilled in the art, other arrangements of floatation modules may be readily assembled using the widthwise extending tubular liners 35a and/or the medial widthwise extending tubular liners 35b.

The steel cable 40 in the illustrated embodiment preferably includes a fixed end fixture 41 and an adjustable end fixture 42 secured thereto. The adjustable end fixture 42 preferably includes a threaded swaged fitting 43. The threaded swaged fitting 43 may be secured by a nut 44 threaded thereon. One or more washers 45 are preferably positioned adjacent the outer concrete shell surface to evenly distribute the applied compressive forces. The inner walls of the tubular liners 31, 35a provide a smooth surface for passage of the steel cables 40 thereagainst.

A relatively large tension, up to several thousand pounds, may be placed on the steel cables 40 to hold the floatation modules 25 in compression. An assemblage of floatation modules 25 maintained in compression by the tension of the steel cables 40 may be considered as acting as a single monolithic structure.

Referring more particularly to FIG. 6, the lengthwise extending tubular liners 31 and the widthwise extending tubular liners 35a intersect and the respective steel cables 40 passing therethrough are sized so that two cables 40 may readily cross at the point of intersection. Preferably the tubular liners 31, 35a have an inner diameter of approximately 1.25" and the steel cables 40 are approximately ½". Sufficient clearance is therefore provided to allow the lengthwise and widthwise extending cables 40 to cross adjacent to one another.

Figure 9:
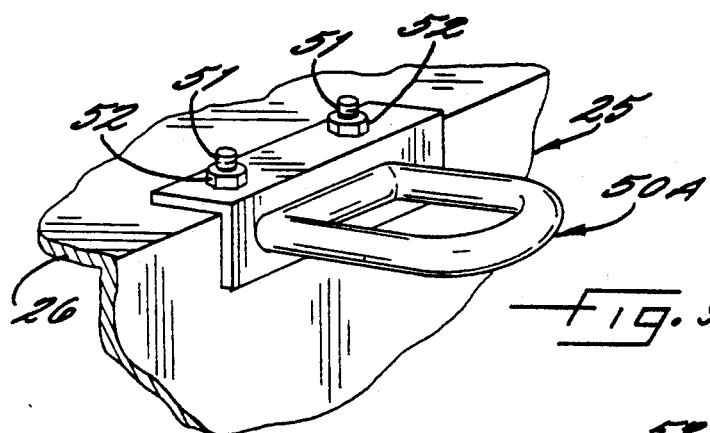
FIGS. 9 and 10 are fragmentary perspective views of attachment fixtures secured to a portion of the concrete floatation module according to the present invention.
Figure 10:
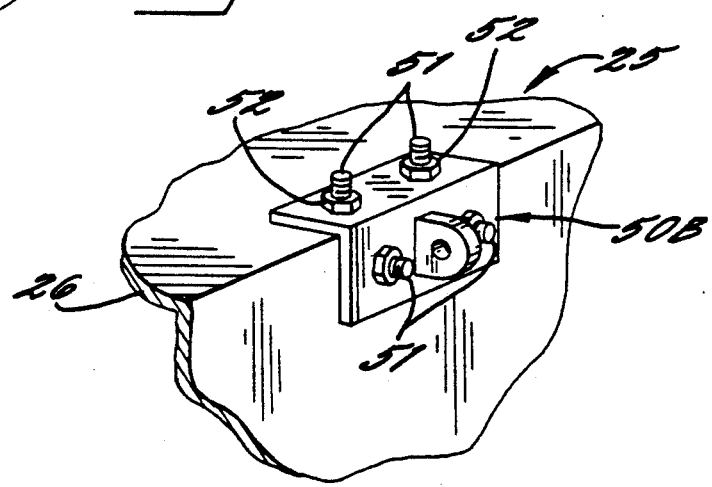

As shown in FIGS. 9 and 10, various attachments 50a, 50b may be affixed to a concrete floatation module 25 by integrally molding a securing means, such as a threaded fastener 51, extending through an outer portion of the concrete shell 26. An attachment 50a, 50b may then be fitted over the threaded fasteners 51 and secured thereto with suitable nuts 52. An attachment 50a, 50b may be used to secure the assemblage of modules 30 to a driven piling or to a submerged anchor, or to secure lines from boats.

Figure 7:
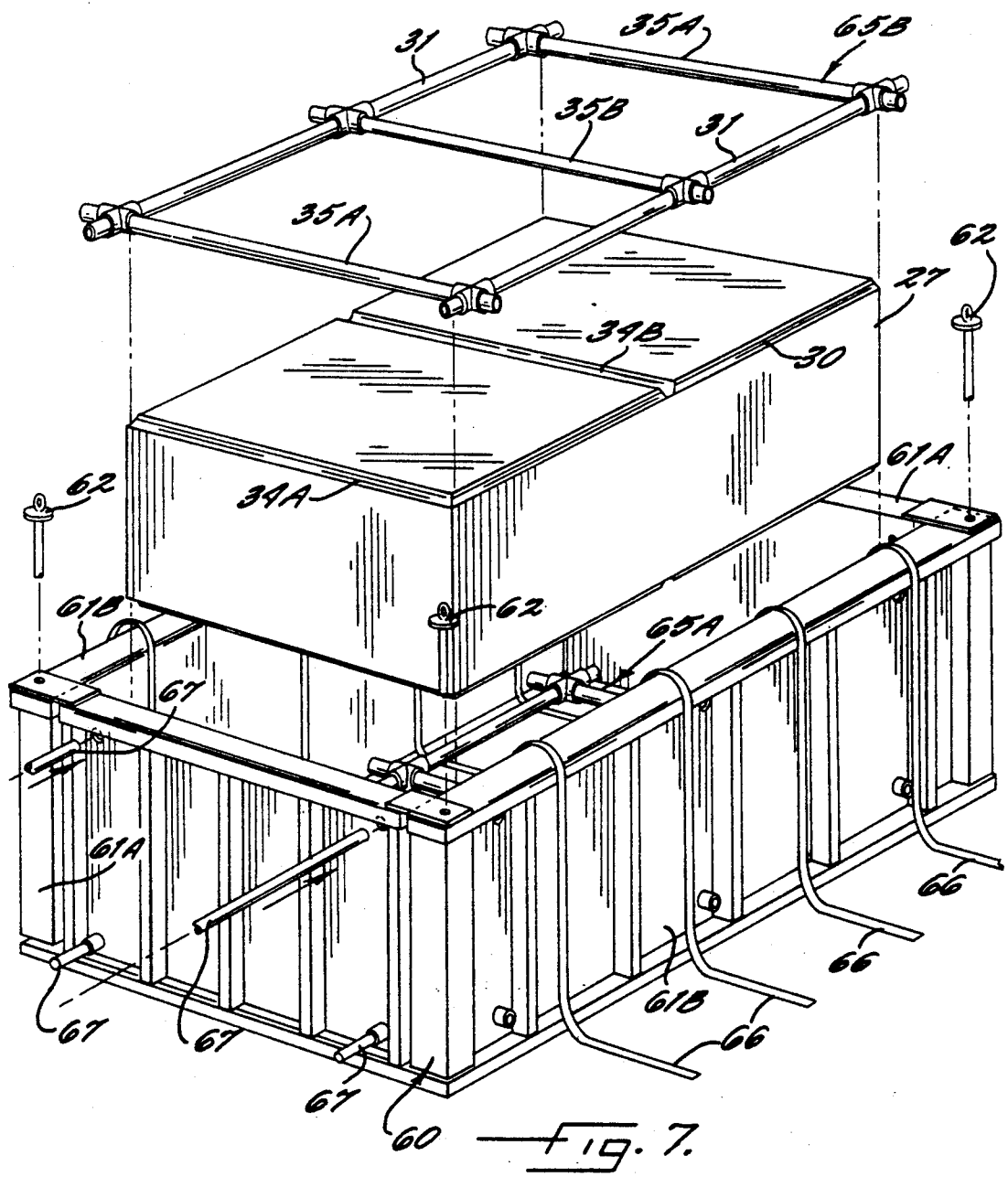
FIG. 7 is an exploded perspective view of a mold and buoyant core used in making the concrete floatation module according to the present invention.
Figure 8:
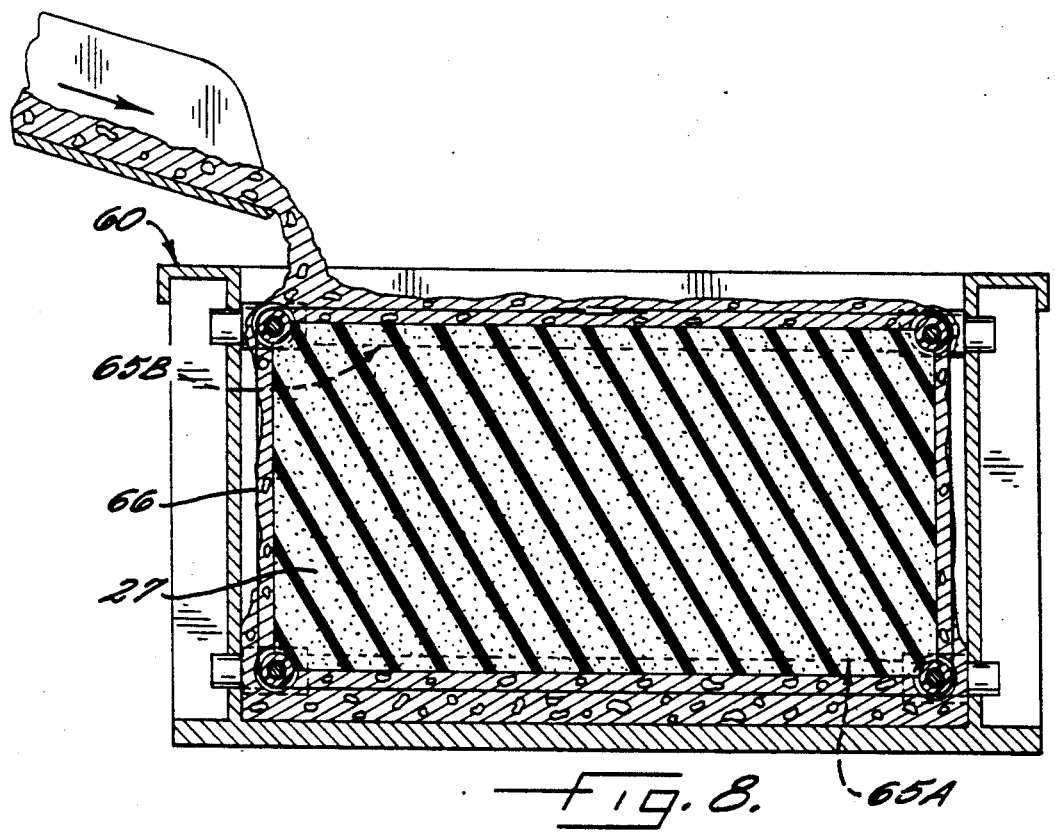
FIG. 8 is a cross-sectional view of the mold and buoyant core positioned therein and concrete being poured therein to make the concrete floatation module according to the present invention.

The method according to the present invention may be best understood by reference to FIGS. 7 and 8. As shown in the exploded view of FIG. 7, a generally rectangular mold 60 is provided with disengageable widthwise sidewalls 61a and lengthwise sidewalls 61b secured together by removable locking pins 62. A first, or lower, assembly of tubular liners 65a is fitted into the bottom portion of the mold 60. End portions of the tubular liners extend outwardly through corresponding openings in the mold.

Securing straps 66 are placed beneath the lower tubular liner assembly 65a and extended along the inner sidewalls of the mold 60 to the outside of the mold. The buoyant core 27, formed as described above by removing corner portions and heat fusing the exposed channel surfaces, is then fitted into the mold so that the open-sided channels 30, 34a, 34b engage the lower tubular liner assembly 65a. The second, or upper, tubular liner assembly 65b is then fitted into the mold so that the tubular liners 31, 35a, 35b also engage each of the respective open-sided channels 30, 34a, 34b on the upper portion of the buoyant core 26.

The securing straps 66 may then be fastened surrounding the lower tubular liner assembly 65a, the buoyant core 27, and the upper tubular liner assembly 65b. For the lengthwise extending tubular liners 31 in particular, metal reinforcing pipes 67 are preferably inserted therein prior to the concrete pouring step (FIG. 8) to maintain the buoyant core 27 is proper alignment despite the buoyant action of the core in the wet concrete. The securing straps 66 also serve to hold the buoyant core 27 accurately positioned within the mold 60 so that the wall thicknesses of the concrete shell 26 have the desired uniform dimensions. If the wall thickness vary, such a concrete floatation module would likely have an undesirable list when placed into the water.

As shown in FIG. 8, concrete may then be poured into the mold 60 to fill the space surrounding the buoyant core 27 thereby forming the molded concrete shell 27. The tubular liner assemblies 65a, 65b serve to suspend the buoyant core 27 within the mold 60. If desired, threaded fasteners 51 (FIGS. 9 and 10) may be positioned in the concrete before curing to allow an attachment 50a, 50b to be secured to the floatation module 25.

As would be readily understood by those skilled in the art, four lengthwise extending tubular liners 31 may also be used to hold the buoyant core 27 in proper position within the mold 60. In other words, if widthwise extending tubular liners 35a, 35b are not desired in the concrete floatation module 25, the four lengthwise extending tubular liners 31 positioned in the corner portions of the mold will hold the core in proper position, especially when securing straps 66 are fastened surrounding the liners and core.

After the concrete is cured, the floatation module 25 may be removed from the mold 60. Thus, a concrete floatation module 25 may readily be formed on-site and then transported to a nearby body of water according to the method of the present invention. To simplify this transportation step, a cable may be placed through one of the tubular liners 31 and the cable ends may then be connected to a backhoe, crane or other lifting device.

Many modifications and other embodiments of the invention will come to one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

That which is claimed is:

1. A rectangular floatation module for use as a floating dock or breakwater, said module comprising:
   a molded generally rectangular concrete shell;
   a core positioned within said molded concrete shell, said core comprising a generally rectangular block of rigid floatation material having lengthwise extending cutaway corner portions defining respective lengthwise extending continuous open-sided channels at each of the lengthwise extending corners of said core, said rectangular block of rigid flotation material also having widthwise extending cutaway corner portions defining respective widthwise extending continuous open-sided channels at each of said widthwise extending corners of said core; and
   a respective tubular liner received in each of said lengthwise extending continuous open-sided channels and said widthwise extending continuous open-sided channels of said core, each of said tubular liners having opposite ends being open to present a passageway therethrough to facilitate interconnecting a series of floatation modules.

2. A rectangular floatation module according to claim 1 wherein said lengthwise extending tubular liners intersect respective ones of said widthwise extending tubular liners lying in a common plane.

3. A rectangular floatation module according to claim 1 wherein each opposing side of a widthwise extending medial portion of said core has a respective widthwise extending continuous open-sided channel therein; and further comprising a respective tubular liner received in each of said medial widthwise extending continuous open-sided channels of said core.

4. A rectangular floatation module according to claim 1 wherein at least two of said tubular liners extend outwardly a predetermined distance beyond an end of said molded concrete shell to facilitate alignment with an adjacent module.

5. A rectangular floatation module according to claim 4 wherein at least two of said tubular liners are recessed inwardly a predetermined distance from an end of said molded concrete shell to facilitate alignment with an adjacent module.

6. A rectangular floatation module according to claim 1 wherein said rigid floatation material of said core is expanded polystyrene foam; and wherein all of said cutaway corner portions of said core are heat-fused to provide a more impervious surface to moisture and to strengthen the surface.

7. A rectangular floatation module according to claim 1 wherein each of said tubular liners comprise a plastic material to avoid corrosion in a marine environment.

8. A rectangular floatation module according to claim 1 wherein said concrete shell includes polyolefin fibers for reinforcing said molded concrete shell.

9. A rectangular floatation module according to claim 1 further comprising securing means, integrally molded in a predetermined portion of said concrete shell and having portions extending outwardly therefrom, for permitting securing of an attachment to said concrete shell.

10. A rectangular floatation module for use as a floating dock or breakwater, said module comprising:
a molded generally rectangular concrete shell;
a core positioned within said molded concrete shell, said core comprising a generally rectangular block of rigid floatation material having lengthwise extending cutaway corner portions defining respective lengthwise extending continuous open-sided channels at each of the lengthwise extending corners of said core; and
a respective tubular liner received in each of said lengthwise extending continuous open-sided channels of said core, each of said tubular liners having opposite ends being open to present a passageway therethrough to facilitate interconnecting a series of floatation modules.

11. A rectangular floatation module according to claim 10 wherein at least two of said lengthwise extending tubular liners extend outwardly a predetermined distance beyond an end of said molded concrete shell to facilitate alignment with an adjacent module.

12. A rectangular floatation module according to claim 11 wherein at least two of said lengthwise extending tubular liners are recessed inwardly a predetermined distance from an end of said molded concrete shell to facilitate alignment with an adjacent module.

13. A rectangular floatation module according to claim 10 wherein said rigid floatation material of said core is expanded polystyrene foam; and wherein all of said lengthwise extending cutaway corner portions of said core are heat-fused to provide a more impervious surface to moisture and to strengthen the surface.

14. A rectangular floatation module according to claim 10 wherein each of said lengthwise extending tubular liners comprise a plastic material to avoid corrosion in a marine environment.

15. A rectangular floatation module according to claim 10 wherein said concrete shell includes polyolefin fibers for reinforcing said molded concrete shell.

16. A rectangular floatation module according to claim 10 further comprising securing means, integrally molded in a predetermined portion of said concrete shell and having portions extending outwardly therefrom, for permitting securing of an attachment to said concrete shell.

17. A structure for use as a floating dock or breakwater comprising:
a plurality of rectangular floatation modules arranged in an end-to-end series relation, each of said modules comprising
a molded generally rectangular concrete shell,
a core positioned within said molded concrete shell, said core comprising a generally rectangular block of rigid floatation material having lengthwise extending cutaway corner portions defining respective lengthwise extending continuous open-sided channels at each of said lengthwise extending corners of said core, and
a respective tubular liner received in each of said lengthwise extending continuous open-sided channels of said core, each of said tubular liners having opposite ends being open to present a passageway therethrough to facilitate interconnecting a series of floatation modules; and
interconnecting means extending through said passageways presented by each of said lengthwise extending tubular liners for interconnecting and maintaining said rectangular floatation modules in said end-to-end series relation.

18. A structure according to claim 17 wherein at least one of said floatation modules has at least two of said lengthwise extending tubular liners extending outwardly a predetermined distance beyond an end of said molded concrete shell to facilitate alignment with an adjacent module.

19. A structure according to claim 18 wherein at least one of said floatation modules has at least two of said lengthwise extending tubular liners recessed inwardly a predetermined distance from an end of said molded concrete shell to facilitate alignment with an adjacent module.

20. A structure according to claim 17 wherein said interconnecting means comprises a cable and means for tensioning said cable to maintain said modules under compression in said end-to-end series relation.

21. A structure according to claim 17 wherein said interconnecting means comprises a rod and means for tensioning said rod to maintain said modules under compression in said end-to-end series relation.

22. A structure according to claim 17 wherein at least one of said floatation modules further comprises a core having widthwise extending cutaway corner portions defining widthwise extending continuous open-sided channels at each widthwise extending corner of said core; and a respective tubular liner received in each of said widthwise extending open-sided channels.

23. A core adapted for serving as a molding core for a concrete floatation module and for providing buoyancy thereto, said core comprising a generally rectangular block of rigid foam material, said block having cutaway corner portions defining lengthwise extending continuous open-sided channels therein.

24. A core according to claim 23 wherein said rigid foam material comprises expanded polystyrene foam.

25. A core according to claim 23 wherein said block further comprises cutaway corner portions defining widthwise extending continuous open-sided channels therein.

26. A core according to claim 25 wherein each opposing side of a widthwise extending medial portion of said block has a respective widthwise extending continuous open-sided channel therein.

27. A core according to claim 26 wherein the surface of all of said open-sided channels are heat-fused to provide a more impervious surface to moisture and to strengthen the surface.

28. A core according to claim 26 wherein all of said open-sided channels are arcuately shaped in cross-section.

29. A core adapted for serving as a molding core for a concrete floatation module and for providing buoyancy thereto, said core comprising a generally rectangular block of rigid foam material, said block having cutaway corner portions defining lengthwise extending continuous open-sided channels therein, said block further comprises cutaway corner portions defining widthwise extending continuous open-sided channels therein, and all of said open-sided channels being arcuately shaped in cross-section.

30. A core according to claim 29 wherein said rigid foam material comprises expanded polystyrene foam.

31. A core according to claim 29 wherein each opposing side of a widthwise extending medial portion of said block has a respective widthwise extending continuous open-sided channel therein.

32. A core according to claim 31 wherein the surface of all of said open-sided channels are heat-fused to provide a more impervious surface to moisture and to strengthen the surface.

33. A method for forming a rectangular floatation module for use as a floating dock or breakwater, said method comprising the steps of:
positioning four tubular liners in each of the respective lengthwise extending corner portions of a generally rectangular mold with the tubular liners supporting a buoyant molding core of a generally rectangular block of rigid floatation material in a spaced apart relation from the sides and bottom of the mold; and
pouring concrete into the mold to fill the space between the buoyant core and the mold and to cover the upper surface of the buoyant core to thereby form a concrete shell surrounding the buoyant core while integrally molding the tubular liners into the concrete shell.

34. A method according to claim 33 further comprising the step of forming lengthwise extending continuous open-sided channels in said buoyant molding core.

35. A method according to claim 34 wherein the step of forming lengthwise extending continuous open-sided channels comprises forming same by passing a heated cutter along the lengthwise extending corner portions to effect cutting while also heat fusing the surface of the cut channels.

36. A method according to claim 33 further comprising the step of mixing polyolefin reinforcing fibers into the concrete before pouring the concrete into the mold.

37. A method according to claim 33 further comprising the step of fastening at least one securing strap surrounding the tubular liners and the core to maintain the core in proper position within the mold prior to setting of the concrete.

38. A method according to claim 33 further comprising the step of inserting a respective elongate reinforcing member into each tubular liner to prevent bending thereof to further serve to maintain the core in proper position within the mold prior to setting of the concrete.

39. A method for forming a rectangular floatation module for use as a floating dock or breakwater, said method comprising the steps of:
positioning a lower rectangular assembly of intersecting lengthwise and widthwise extending tubular liners in a lower portion of a rectangular mold;
positioning a buoyant rigid core within the mold and onto the lower assembly of tubular liners, the buoyant core having lengthwise and widthwise extending cutaway corner portions defining lengthwise and widthwise extending continuous open-sided channels receiving therein the lower assembly of tubular liners;
positioning an upper rectangular assembly of intersecting lengthwise and widthwise extending tubular liners onto the buoyant core within the mold, the upper assembly of tubular liners being received within the respective lengthwise and widthwise extending continuous open-sided channels of the buoyant core; and
pouring concrete in the mold surrounding the buoyant core and the lower and upper assemblies of tubular liners;
whereby the lower and upper assemblies of lengthwise and widthwise extending tubular liners maintain the buoyant core in proper position within the mold despite the buoyant effect of the wet concrete on the buoyant core.

40. A method according to claim 39 further comprising the step of fastening at least one securing strap surrounding the lower and upper lengthwise extending tubular liners and the core to maintain the core in proper position within the mold prior to setting of the concrete.

41. A method according to claim 39 further comprising the step of inserting a respective elongate reinforcing member into each lengthwise extending tubular liner of the lower and upper tubular liner assemblies to prevent bending thereof to maintain the core in proper position within the mold prior to setting of the concrete.

42. A method according to claim 39 further comprising the step of mixing polyolefin reinforcing fibers into the concrete before pouring the concrete into the mold.

* * * * *